United States Patent [19]

Terawaki et al.

[11] Patent Number: 5,302,061
[45] Date of Patent: Apr. 12, 1994

[54] DOOR OPENING AND CLOSING DEVICE USING A ROBOT

[75] Inventors: Toyofumi Terawaki; Osamu Tanigawa, both of Nagoya, Japan

[73] Assignee: Brother Kogyo Kabushiki Kaisha, Nagoya, Japan

[21] Appl. No.: 956,281

[22] Filed: Oct. 5, 1992

[30] Foreign Application Priority Data

Oct. 18, 1991 [JP] Japan .................................. 3-271355

[51] Int. Cl.$^5$ .................................................. B23Q 11/08
[52] U.S. Cl. ...................................... 409/134; 51/274; 408/67; 483/3; 483/901; 901/40
[58] Field of Search .............................. 483/3, 68, 901; 409/134, 136; 408/14, 16, 67, 68; 82/901; 901/40, 41; 51/274

[56] References Cited

U.S. PATENT DOCUMENTS

| | | | |
|---|---|---|---|
| 4,359,815 | 11/1982 | Toyoda | 483/901 X |
| 4,809,422 | 3/1989 | Kitamura | 483/68 X |
| 4,863,320 | 9/1989 | Rütschle et al. | 409/134 |
| 4,966,505 | 10/1990 | Winkler et al. | 409/134 |
| 5,181,898 | 1/1993 | Piotrowski | 483/3 |

FOREIGN PATENT DOCUMENTS 8703230  1/1987  World Int. Prop. O. ............ 82/901

Primary Examiner—Z. R. Bilinsky
Attorney, Agent, or Firm—Oliff & Berridge

[57] ABSTRACT

An NC machine surrounded by a housing provided with a door on a front surface of the housing so that a workpiece may be loaded into the housing and unloaded therefrom when the door is in an open condition. An articulated robot, for replacing the workpiece, is provided so as to be laterally movable along an opening and closing direction of the door. Such a laterally movable function of the articulated robot permits a hand of the robot to grip a desired one of the workpieces arranged in lateral and longitudinal directions on a stock table. The articulated robot is provided with a sensor for detecting a dog provided on the door and an air cylinder for connecting the robot to the door when the dog is detected by the sensor. Accordingly, after the robot is connected to the door by the air cylinder, the door can be opened and closed by the lateral movement of the articulated robot.

15 Claims, 8 Drawing Sheets

| ITEM | INSTRUCTIONS |
|---|---|
| 100 | MOVE ARMS OF ROBOT TO WAITING POSITIONS |
| 110 | MOVE ROBOT TO FULLY CLOSED POSITION OF DOOR |
| 120 | MOVE ROBOT IN OPENING DIRECTION OF DOOR AT LOW SPEED |
| 130 | PROXIMITY SENSOR ON ? |
| 140 | ENERGIZE AIR CYLINDER TO CONNECT ROBOT TO DOOR |
| 150 | MOVE ROBOT TO FULLY OPEN POSITION OF DOOR AT HIGH SPEED |
| 160 | STOP ROBOT AT ITS ENTRY POSITION |
| 170 | REPLACE WORKPIECE |
| 180 | MOVE ARMS OF ROBOT TO WAITING POSITIONS |
| 190 | MOVE ROBOT TO FULLY CLOSED POSITION OF DOOR AT HIGH SPEED |
| 200 | DEENERGIZE AIR CYLINDER |

DOOR OPENING AND CLOSING DEVICE USING A ROBOT

BACKGROUND OF THE INVENTION

1. Field of the Invention

The invention relates to a door opening and closing device for opening and closing a door of, for example, a numerical control (NC) machine by using a moving robot.

2. Description of Related Art

It is known that an NC machine is surrounded by a housing so as to prevent lubricating oil, chips, and similar materials from being scattered around during machining. The housing is provided with a large-sized sliding door so that the workpiece to be machined can be loaded into the housing and the machined workpiece removed from the housing using a robot.

The robot is an articulated robot, having a plurality of arms, and it is usually located in the vicinity of the door. A leading one of the arms is provided at its free end with a hand for gripping the workpiece. The workpiece to be machined is moved, by operating the arms, from the outside of the housing to a working position in the housing and the machined workpiece is moved again, by operating the arms, from the working position to the outside of the housing.

In moving the workpiece, using the arms of the articulated robot as mentioned above, it is necessary to open the sliding door to create an opening through which the workpiece and the arms can pass. A large-sized air cylinder is necessary for opening and closing the large-sized sliding door. If the articulated robot is operated to enter the housing under the condition where the sliding door is not sufficiently opened, there is a risk that the articulated robot will contact the sliding door. Accordingly, it is necessary to provide sensors for detecting opposite edges of the opening as defined by the open condition of the sliding door.

As mentioned above, in loading or unloading the workpiece into or from the housing, by operating the arms of the articulated robot, and machining the workpiece in the housing of the NC machine, it is necessary to open and close the large-sized sliding door and it is accordingly necessary to provide the large-sized air cylinder for driving the large-sized sliding door. Further, it is also necessary to provide a device for driving the large-sized air cylinder. In addition, it is necessary to provide at least two sensors for detecting the opposite edges of the opening defined by the open condition of the sliding door. For these reasons, the door opening and closing device in the prior art is complicated in construction and causes an increase in cost.

In addition, in such a device for opening and closing the sliding door by using an air cylinder, the operating speed of the sliding door and the positioning of the sliding door cannot be precisely controlled so that the period of time (cycle time) for loading and unloading of the workpiece by the articulated robot cannot be shortened.

SUMMARY OF THE INVENTION

It is accordingly an object of the invention to provide a door opening and closing device, using a robot, which can open and close a door quickly and precisely yet has a simple structure.

According to the invention, there is provided a door opening and closing device comprising a robot adapted to be moved; a door arranged along a moving direction of the robot; connecting means for connecting the robot and the door to each other; and opening and closing means for moving the robot to open and close the door under the condition where the robot and the door are connected with each other by the connecting means.

In the door opening and closing device of the invention, when the connecting means connects the robot and the door, arranged along the moving direction of the robot, to each other, the opening and closing means moves the robot to thereby open and close the door connected to the robot.

That is, the opening and closing operation of the door is performed using the movement of the robot according to the invention.

As described above, according to the invention, the robot and the door are connected to each other by the connecting means and the robot is moved by the opening and closing means to open and close the door.

Accordingly, it is unnecessary to use a large-sized special air cylinder for sliding the door as employed in the prior art, but the opening and closing operation of the door can be performed by using the movement of the robot so that the structure of the device can be simplified and the cost can be reduced. Further, the opening and closing operation of the door can be performed quickly and precisely. In addition, it is unnecessary to provide the sensors for detecting the opposite edges of the opening as defined by the open condition of the door.

BRIEF DESCRIPTION OF THE DRAWINGS

A preferred embodiment according to the invention will be described in detail with reference to the following figures, wherein.

DETAILED DESCRIPTION OF THE PREFERRED EMBODIMENT

There will now be described a door opening and closing control device employing a robot in a preferred embodiment according to the invention with reference to the drawings.

First, a door opening and closing control device for performing door opening and closing control for an NC machine will be described with reference to FIGS. 1 and 2.

Figure 1:
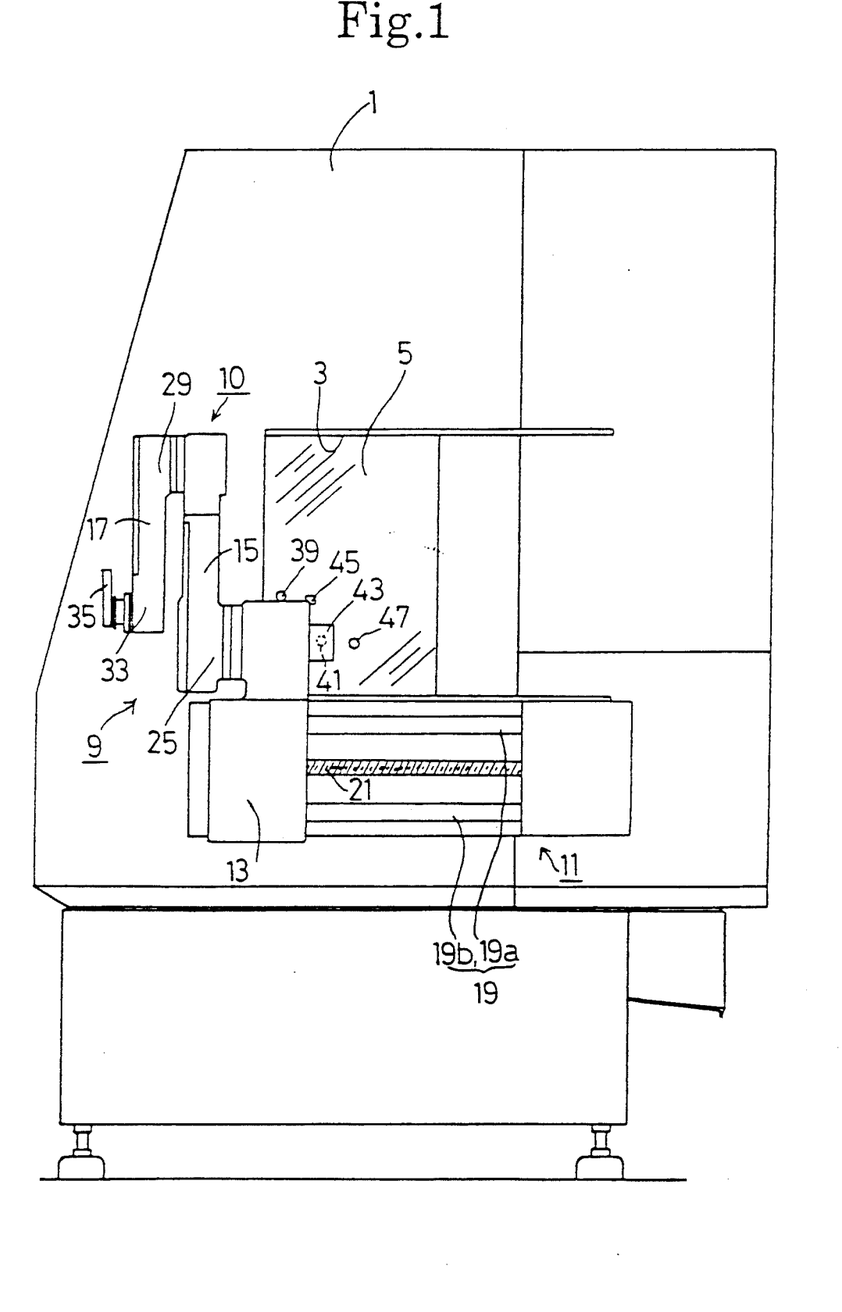
FIG. 1 is a front elevational view of a door opening and closing control device in a preferred embodiment according to the invention.

Referring to FIG. 1, reference numeral 1 designates a housing for accommodating the NC machine so as to surround the same. An opening 3 is formed through a front surface of the housing 1. A door 5 for opening and closing the opening 3 is laterally movably mounted on the front surface of the housing 1. An articulated robot 9 for moving and positioning a workpiece 7 (see FIG. 8) and for lateral movement of the door 5 is laterally movably mounted on the front surface of the housing 1. A sliding mechanism 11 for laterally moving the articulated robot 9 is mounted on the front surface of the housing 1 under the door 5.

The articulated robot 9 includes a slider 13 laterally slidably mounted on the sliding mechanism 11 and a robot body 10 provided on the slider 13 so as to be moved therewith. The robot body 10 includes a first arm 15 connected to the slider 13, a second arm 17 connected to the first arm 15, and a hand 35 connected to the second arm 17. The first arm 15 is connected through a first articulation joint 25 to the slider 13. The second arm 17 is connected through a second articulation joint 29 to the first arm 15. The hand 35 is connected through a third articulation joint 33 to the second arm 17.

The sliding mechanism 11 includes two guide shafts 19a and 19b (which will hereinafter referred to generically as 19), arranged in parallel to a moving direction of the door 5, to guide the slider 13, a ball screw mechanism 21 arranged between the guide shafts 19 to move the slider 13, and a slider motor 23 (see FIG. 3) arranged at a right end portion of the ball screw mechanism 21 to drive the ball screw mechanism 21.

The slider 13 constitutes a base of the articulated robot 9 threadedly engaging the ball screw mechanism 21 and adapted to be moved laterally along the ball screw mechanism 21. The slider 13 includes a first arm motor 27 (see FIG. 3) for driving the first arm 15 through a gear of the first articulation joint 25.

The first arm 15 includes a second arm motor 31 (see FIG. 3) for driving the second arm 17 through a gear of the second articulation joint 29, and the second arm 17 includes a hand motor 37 (see FIG. 3) for driving the hand 35 through a gear of the third articulation joint 33. Encoders 23a, 27a, 31a and 37a (see FIG. 3) are provided to detect rotational positions of the motors 23, 27, 31 and 37, respectively, and origin sensors 23b, 27b, 31b and 37b (see FIG. 3) are provided to detect origins of the motors 23, 27, 31 and 37, respectively.

Figure 2:
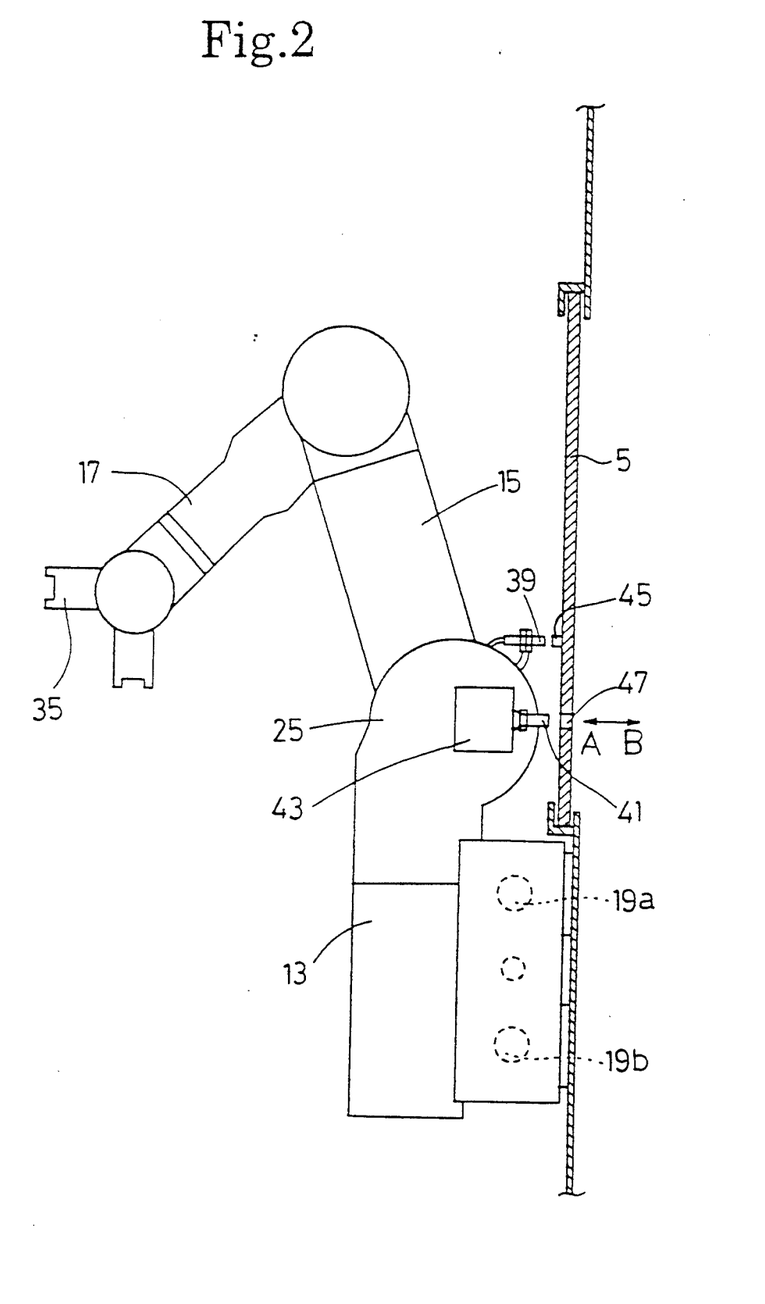
FIG. 2 is a right side view, partially in section, of the door opening and closing control device shown in FIG. 1.

As shown in FIG. 2, a proximity sensor 39, for detecting the approach of a position detection member by a change in magnetism, and an air cylinder 43, having a rod 41 movable in opposite directions as depicted by arrows A and B, are mounted on the first articulation joint 25 so as to face the door 5.

A position detection dog 45 is a position detection member that is detected by the proximity sensor 39 and is mounted on the door 5 at a position corresponding to the proximity sensor 39. Further, a joint hole 47, for receiving the rod 41, is formed through the door 5 at a position opposed to the rod 41 when the dog 45 is detected by the proximity sensor 39.

Figure 3:
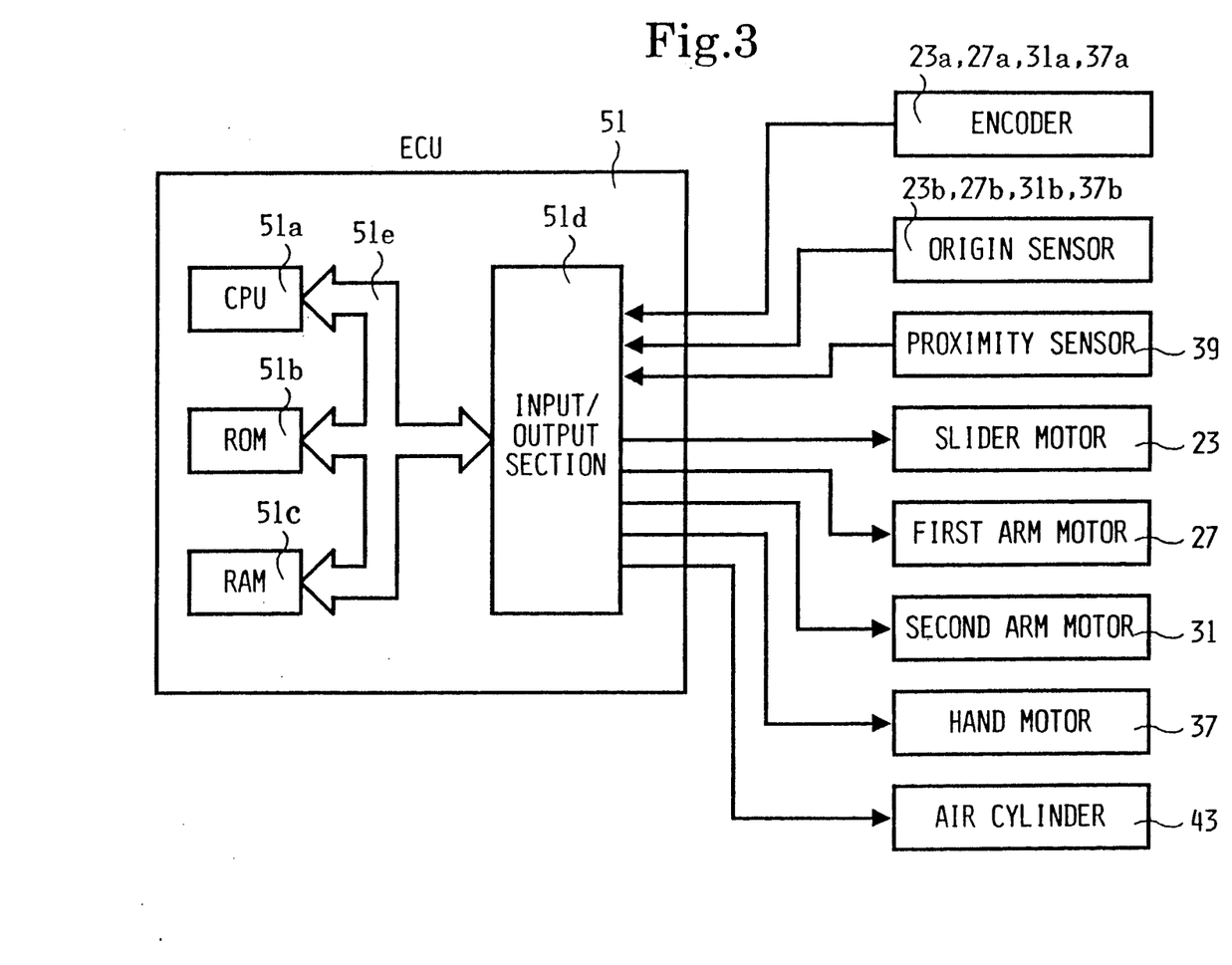
FIG. 3 is a block diagram of an electrical structure of the preferred embodiment.

The articulated robot 9 having the above-mentioned structure is controlled by an electronic control unit (ECU) 51 as shown in FIG. 3.

The ECU 51 includes a CPU 51a, a ROM 51b and a RAM 51c, which are well known in the art, constituting a primary section of a logic operation circuit. The ECU 51 further includes an input/output section 51d for performing input and output between the ECU 51 and external equipment. The CPU 51a, the ROM 51b, the RAM 51c and the input/output section 51d are connected together through a common bus 51e. Connected to the input/output section 51d are the encoders 23a, 27a, 31a and 37a, the origin sensors 23b, 27b, 31b and 37b, and the proximity sensor 39. Also connected to the input/output section 51d are the motors 23, 27, 31 and 37 and the air cylinder 43 through various driving circuits (not shown).

Figure 4A:
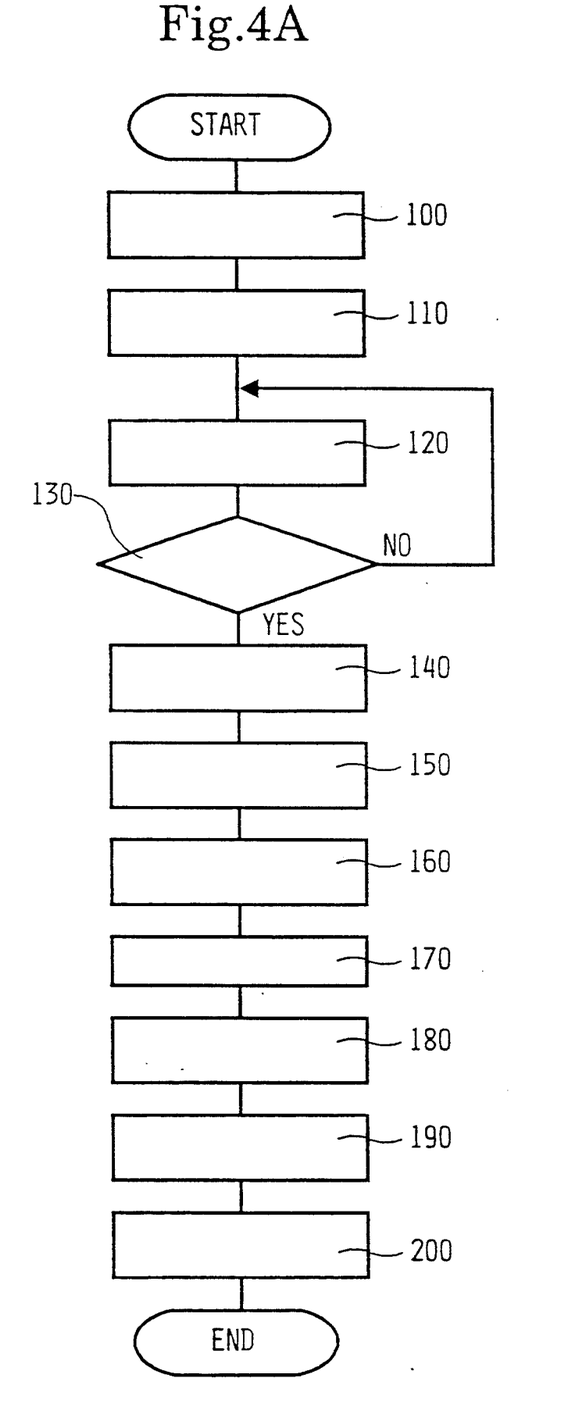
FIG. 4A is a flowchart illustrating an operation of the preferred embodiment.
Figure 4B:
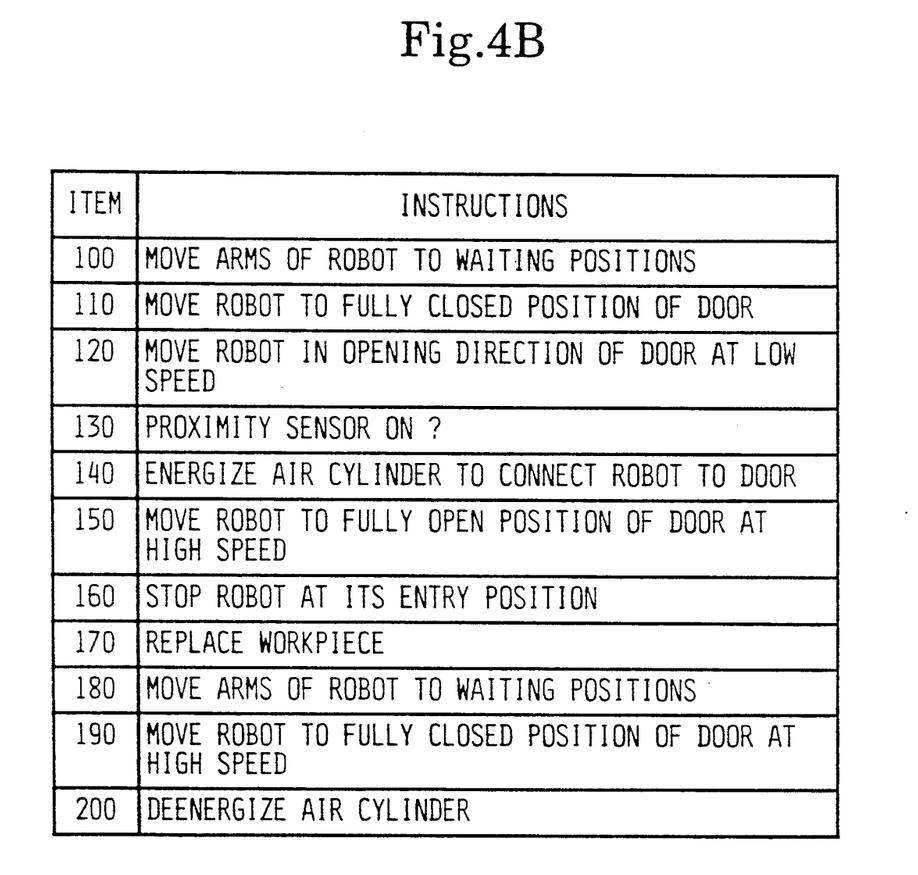
FIG. 4B is a table of labels for the flowchart of FIG. 4A.

The operation of the door opening and closing control device in the preferred embodiment will be described with reference to the flowchart shown in FIGS. 4A and 4B. The views shown in FIGS. 5 to 8 illustrate the operation of the door 5 and the articulated robot 9.

Figure 5:
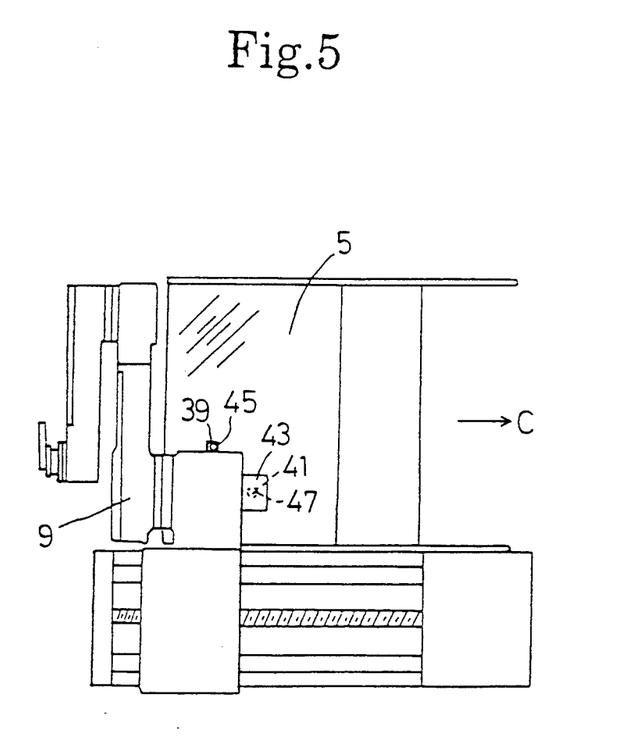
FIGS. 5, 6 and 7 are front elevational views illustrating an opening operation of a door.

In step 100, the arms 15 and 17 of the articulated robot 9 are moved to their waiting positions (original positions). In step 110, the slider motor 23 is driven to move the robot body 10 along the guide shafts 19 to a fully closed position (an initial position) of the door 5 as shown in FIG. 5.

In step 120, the articulated robot 9 is moved in an opening direction (a direction depicted by an arrow C in FIG. 5) of the door 5 at a low speed and, in step 130, it is determined whether or not the proximity sensor 39 is on, that is, whether or not the proximity sensor 39 has detected the dog 45. If the answer in step 130 is YES, the program proceeds to step 140, while if the answer in step 130 is NO, the program returns to step 120. In the case where the door 5 has already been closed, the proximity sensor 39 is turned on in step 130 simultaneously with the movement in step 120.

In step 140, the air cylinder 43 is driven to insert the rod 41 into the joint hole 47, thereby connecting the articulated robot 9 to the door 5.

Figure 6:
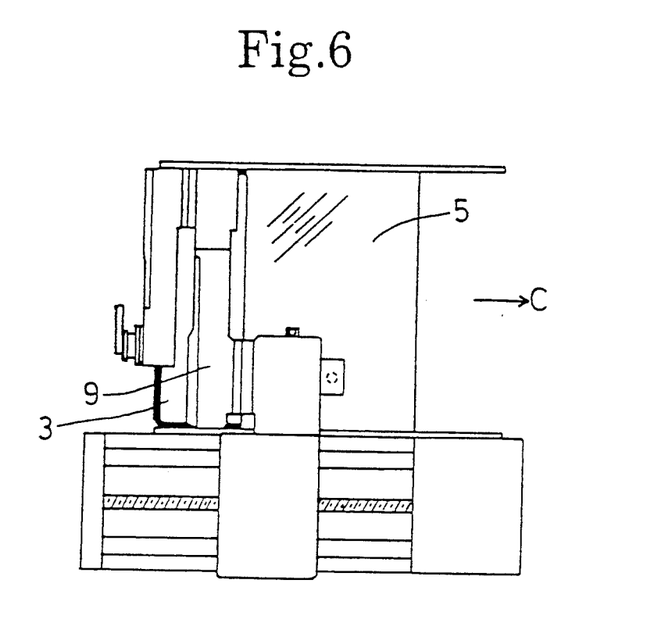

In step 150, the articulated robot 9, connected to the door 5, is moved to a fully open position of the door 5 in the direction of the arrow C at a high speed as shown in FIG. 6, thereby opening the door 5 to widen the opening 3.

Figure 7:
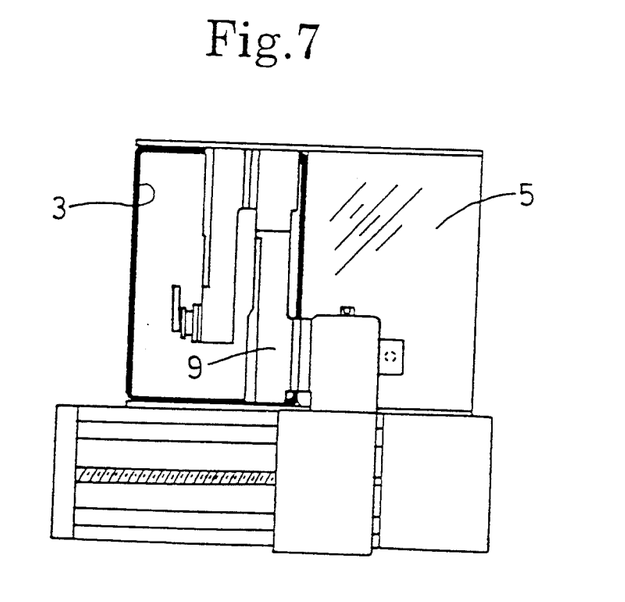

In step 160, the articulated robot 9 is stopped at its entry position where the robot body 10 is opposed to the opening 3, as shown in FIG. 7.

Figure 8:
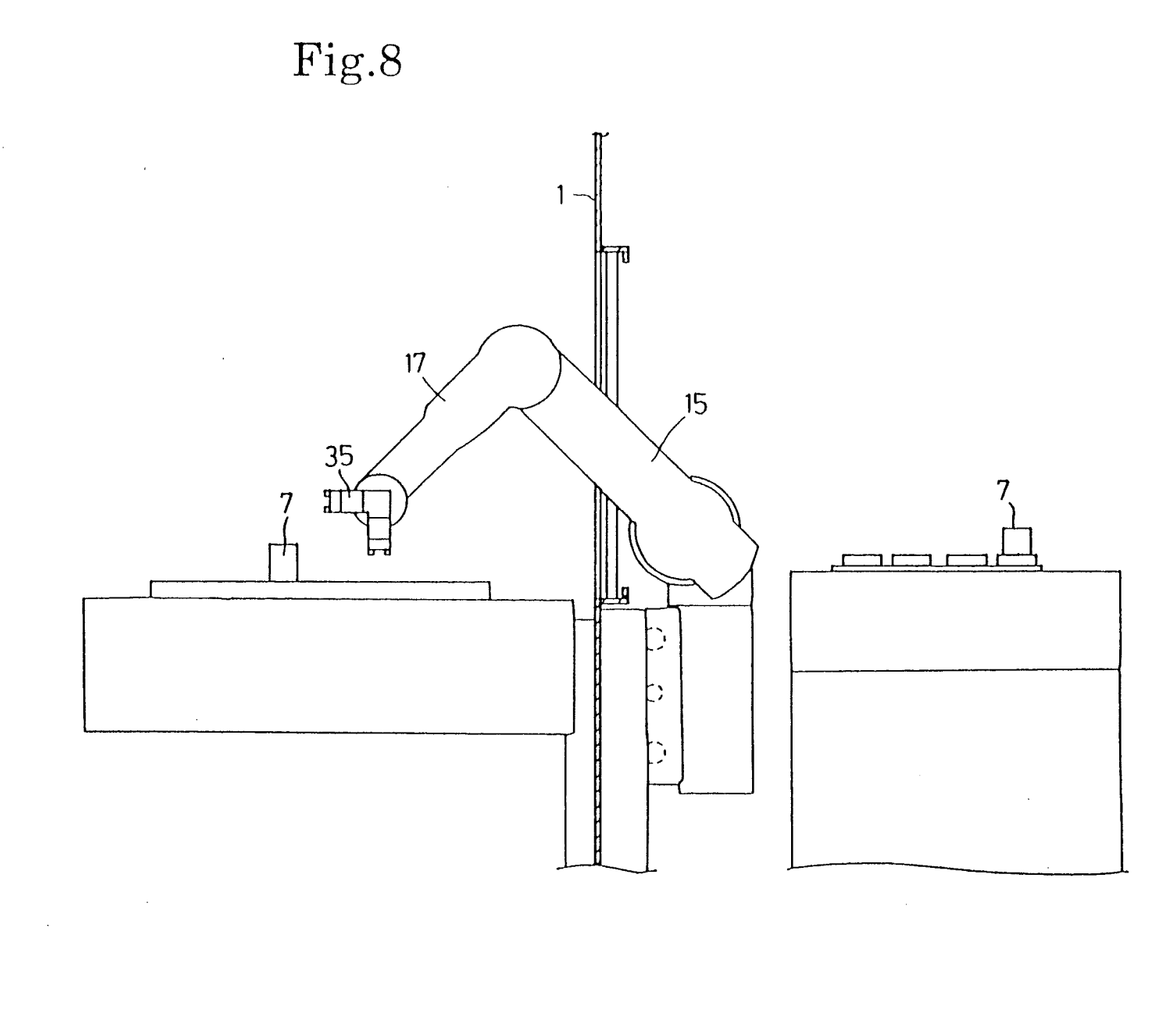
FIG. 8 is a left side view, partially in section, of the door opening and closing control device, illustrating operation of a robot.

In step 170, the arms 15 and 17 and the hand 35 are moved into the housing 1 to perform replacement of the workpiece 7, as shown in FIG. 8.

After the replacement of the workpiece 7, the arms 15 and 17 of the articulated robot 9 are moved to their waiting positions in step 180. Then, in step 190, the articulated robot 9 is moved together with the door 5 to the fully closed position of the door 5 at a high speed.

In step 200, the air cylinder 43 is deenergized to disconnect the articulated robot 9 from the door 5 and the program ends.

In the door opening and closing control device in the preferred embodiment, the opening and closing operation for the door 5 is performed using the operation of the articulated robot 9 moving along the guide shafts 19 located below the door 5. Accordingly, it is unnecessary to provide a large-sized air cylinder for opening and closing the door 5 as employed in the prior art, thereby simplifying the driving mechanism for the door 5 and reducing the cost.

The speed in performing the opening and closing control for the door 5 can be controlled by the laterally moving operation of the articulated robot 9. Accordingly, the opening and closing operation for the door 5 can be performed quickly under the precise control.

Even when the door 5 remains stopped in a half open condition, the articulated robot 9 is moved in the opening direction of the door 5, and the proximity sensor 39 accurately detects the position of the door 5. Accordingly, the subsequent opening and closing control of the door 5 can be performed quickly.

It is to be understood that the invention is not limited to the above preferred embodiment, but various modifications may be made without departing from the scope of the invention.

For instance, the moving direction of the door 5 is not limited to a lateral direction, but various directions such as a vertical direction may be adopted. In accordance therewith, the direction of arrangement of the guide shafts 19 may be reset. Further, while a slide door is preferably used as the door 5 because of its simple construction, other kinds of doors, such as a rotating door and a folding door, may be used.

As the sensor for detecting a position of the door 5, various types of sensors, such as a limit switch or a sensor using a photoelectric effect, may be used rather than the proximity sensor 39. Further, the mounting position of the sensor is not particularly limited. For instance, the sensor may be mounted on the door 5. Likewise, the connecting means for connecting the articulated robot 9 to the door 5 is not limited to the air cylinder 43, but various means such as a gripping mechanism or an electromagnetic mechanism may adopted. Further, the mounting position of the connecting means is not particularly limited. For instance, the connecting means may be mounted on the door 5.

What is claimed is:

1. A machine tool comprising:
   a housing;
   a door provided on said housing and adapted to be slidably moved to open and close;
   a robot adapted to enter said housing for replacing a machined workpiece with a workpiece to be machined;
   moving means for moving said robot in a direction parallel to a slideably opening and closing movement direction of said door;
   connecting means for connecting said robot and said door with each other; and
   control means for controlling said moving means so as to move said robot to open and close said door under the condition where said robot and said door are connected to each other by said connecting means.

2. The machine tool as defined in claim 1, further comprising detecting means for detecting if said robot and door reach a predetermined relative approach position, wherein said connecting means connects said robot and door when said detecting means detects said robot and door have reached the predetermined relative approach position.

3. The machine tool as defined in claim 1, wherein said control means controls said moving means so as to move said robot at a first speed until said connecting means connects said robot and said door to each other and to move said robot at a second speed, higher than the first speed, after said connecting means connects said robot and said door to each other.

4. The machine tool as defined in claim 3, wherein said door is adapted to be opened and closed between a fully open position and a fully closed position, and said control means controls said moving means so as to move said robot to the fully open position of said door after said connecting means connects said robot and said door to each other and moves said robot to the fully closed position of said door after said robot replaces the machined workpiece with the workpiece to be machined.

5. The machine tool as defined in claim 2, wherein said detecting means comprises a position detection member and a proximity sensor for detecting an approach of said position detection member by a change in magnetism.

6. The machine tool as defined in claim 1, wherein said connecting means comprises an air cylinder having a rod and a joint hole adapted to receive said rod at a position opposed to said rod.

7. The machine tool as defined in claim 1, wherein said moving means comprises a guide arranged in parallel to said opening and closing direction of said door, a ball screw member arranged in parallel to said guide, and a servo motor for driving said ball screw member.

8. A machine tool comprising:
   a housing;
   a robot adapted to be moved and enter said housing for replacing a machined workpiece with a workpiece to be machined;
   a guide for guiding movement of said robot;
   a door provided on said housing and adapted to be opened and closed along a moving direction of said robot;
   a servo motor for moving said robot along said guide;
   a position detection member provided on one of said robot and said door;
   a proximity sensor for detecting an approach of said position detection member by a change in magnetism to thereby detect a relative approach position between said robot and said door;
   an air cylinder for connecting said robot and said door to each other, said air cylinder having a rod adapted to be inserted into a joint hole disposed opposite to said rod when the relative approach position is detected by said proximity sensor; and
   control means for controlling said servo motor to move said robot to thereby open and close said door under the condition where said robot and said door are connected to each other by said air cylinder.

9. The machine tool as defined in claim 8, wherein said proximity sensor is provided on said robot and said position detection member is provided on said door.

10. The machine tool as defined in claim 8, wherein said air cylinder is provided on said robot and said joint hole is formed through said door.

11. The machine tool as defined in claim 8, further comprising a ball screw member provided in parallel to said guide, wherein said servo motor drives said ball screw member to thereby move said robot.

12. An apparatus having a housing and a robot adapted to move in a predetermined direction, said robot replacing a machined workpiece with a workpiece to be machined, comprising:
   a door capable of being opened and closed and provided on said housing so as to permit said robot to enter said housing;
   connecting means for connecting said robot and said door to each other; and
   moving means for moving said robot under the condition where said robot and said door are connected to each other by said connecting means.

13. The apparatus as defined in claim 12, wherein said moving means moves said robot at a first speed until said connecting means connects said robot and said door to each other, and moves said robot at a second speed, higher than the first speed, after said connecting means connects said robot and said door to each other.

14. The apparatus as defined in claim 12, further comprising detecting means for detecting a relative approach position between said robot and said door, wherein when said detecting means detects the relative approach position, said connecting means connects said robot and said door to each other.

15. The apparatus as defined in claim 12, wherein said connecting means comprises:
   said door having a joint hole;
   an air cylinder; and
   a rod driven by said air cylinder for engaging/disengaging with said joint hole, said joint hole being provided at a position opposed to the rod and receiving the rod at the position.

* * * * *